United States Patent [19]
Halperin

[11] Patent Number: 5,191,636
[45] Date of Patent: Mar. 2, 1993

[54] CONTROL SYSTEM WITH TWO LEVEL SENSOR SYSTEM

[76] Inventor: Janet R. P. Halperin, 75 Wembly Rd., Toronto, Ontario, Canada, M6c 2G3

[21] Appl. No.: 587,913

[22] Filed: Sep. 25, 1990

[51] Int. Cl.[5] .............................................. G06F 15/18
[52] U.S. Cl. ................................. 395/22; 364/571.02; 395/23
[58] Field of Search ............... 395/22, 23; 364/571.01, 364/571.02, 571.06, 571.07

[56] References Cited

U.S. PATENT DOCUMENTS 4,873,655 10/1989 Kondrake ...................... 364/571.07

Primary Examiner—Allen R. MacDonald
Attorney, Agent, or Firm—Bereskin & Parr

[57] ABSTRACT

A system for initiating an action in response to a plurality of variably weighed inputs as a layered configuration, and at least two layers. The first layer has: a) sensors for receiving a plurality of first input signals; b) signal weighting units for applying a weighting to the first input signals; c) a trip device for receiving the weighted first input signals, summing the signals and being activated to produce a trip signal when the sum of the weighted first input signals reaches a predetermined threshold level; and d) a first stage unit for initiating a first active state on receiving the trip signal. The second layer has: a) a sensor for receiving a second input signal on initiation of a first active state; and b) a state unit for initiating a second active state when the second input signal reaches a predetermined threshold level. The initiation of the second active state suppresses the first active state. The system further includes a register for timimg the delay between the production of the trip signal and the suppression of the first active state and a modifier for modifying the weighting applied to the first input signals as a function of the delay.

19 Claims, 6 Drawing Sheets

CONSTANTS
DELTA T=0.10   TAU INPUT GAP=10   ETA=0.40   K1=0.15   MS=100.00
TAU COMPARE=10   ZETA=0.90   MU=0.10   K2=0.30   MR=100.00

R ACTIVITY   11111111111
S ACTIVITY   11111111111
             τ (TAU) →| |←

R ACTIVITY
S ACTIVITY   11111111111
             τ (TAU) →| |←

R ACTIVITY   1111111111111111111
S ACTIVITY        11111111111
             τ (TAU) →| |←

R ACTIVITY   1111111111111111111
S ACTIVITY   11111111111
             τ (TAU) →| |←

CONTROL SYSTEM WITH TWO LEVEL SENSOR SYSTEM

FIELD OF THE INVENTION

This invention relates to a control system and a method for operating a control system, and in particular a control system in which the external situation after actions of the system automatically results in the modifying of the strengths of certain signals internal to the system, thereby increasing the effectiveness of the system.

SUMMARY OF THE INVENTION

According to one aspect of the present invention there is provided a system for initiating an action in response to a plurality of variably weighted inputs. The system has a layered configuration, and in the simplest arrangement comprises two layers. The first layer has: (a) means for receiving a plurality of first input signals; (b) means for applying a weighting to the first input signals; (c) trip means for receiving the weighted first input signals, summing the signals and being activated to produce a trip signal when the sum of the weighted first input signals reaches a predetermined threshold level; and (d) means for initiating a first active state on receiving the trip signal. The second layer has: (a) means for receiving a second input signal resulting as a consequence of the first active state; and (b) means for initiating a second active state when the second input signal reaches a predetermined threshold level. The initiation of the second active state suppresses the first active state. The system further includes means for timing the delay between the production of the trip signal and the suppression of the first active state and means for modifying the weighting applied to the first input signals as a function of the delay.

The first input signals may be received from a first level of sensors and the second input signal received from a second level sensor. The first level sensors may be used to make an initial identification of a condition which is then confirmed by the second sensors. Thus, if the first sensors detect a certain desired condition and the weighting applied to the first input signals is such that the sum of the weighted signals is above the predetermined threshold level the trip signal is produced to initiate the first active state. The second active state is then initiated if the second sensor confirms the presence of the condition.

If the first sensors produce signals which result in a positive result (that is when the second sensor confirms the presence of the desired condition), the system is adapted to increase the weighting which is applied to the first input signals which contributed to the reaching of the predetermined threshold level of the first parameter. In the preferred system, the weighting may be increased up to a maximum level. The increase in weighting in this situation occurs due to the short time interval between the production of the trip signal and the suppression of the first active state.

In circumstances where the trip signal has been produced but the input from the second sensor does not indicate the desired condition, the weighting applied to the first input signals which contributed to the production of the trip signal is decreased to minimise the possibility of the incorrect activation occurring again. In this situation, the first active state continues unsuppressed as the second active state is not initiated. This continues for a predetermined time until an over-ride operates and suppresses the first active state. Thus, the time delay between the production of the trip signal and the suppression and the first active state will be relatively long.

In some systems there may be a significant time interval between the initiation of the first active state and the point when the second input signals are first received. In this situation the delay timing means includes a lag function to take account of this time interval.

The control system may have two or more layers, the only requirement being that one state is capable of definitively recognizing the desired condition.

According to a further aspect of the present invention there is provided a system for initiating an action in response to a plurality of variably weighted inputs. The system has a layered configuration, and may comprise two layers. The first layer has: a) means for receiving a plurality of first input signals and remaining active while receiving the first input signals; b) means for applying a weighting to the first input signals; c) trip means for receiving the weighted first input signals, summing the signals and becoming active when the sum of the weighted first input signals reaches a predetermined threshold level; d) means for initiating a first active state; and e) means for providing a positive feedback from the first active state means to the trip means to maintain the trip means active even if the first input signals receiving means becomes inactive. The second layer has: a) means for receiving a second input signal resulting from a consequence of the first active state; and b) means for initiating a second active state when the second input signal reaches a predetermined level. Initiation of the second active state suppresses the first active state and the positive feedback from the first active state means to the trip means. The system further includes means for measuring the temporal relationship between the activity of the first input signal means and the activity of the trip means, and means for modifying the weighting applied to the first input signals as a function of this temporal relationship.

BRIEF DESCRIPTION OF DRAWINGS

These and other aspects of the present invention will now be described, by way of example, with reference to the accompanying drawings, in which.

DETAILED DESCRIPTION OF PREFERRED EMBODIMENTS

The present invention relates to a control system and the method of operation thereof. The system will be described initially by way of example with reference to a specific application. The system will then be described more generally and the operation of the system described in terms of mathematical functions. This is followed by a description of other specific applications to illustrate various features of the system.

Figure 1:
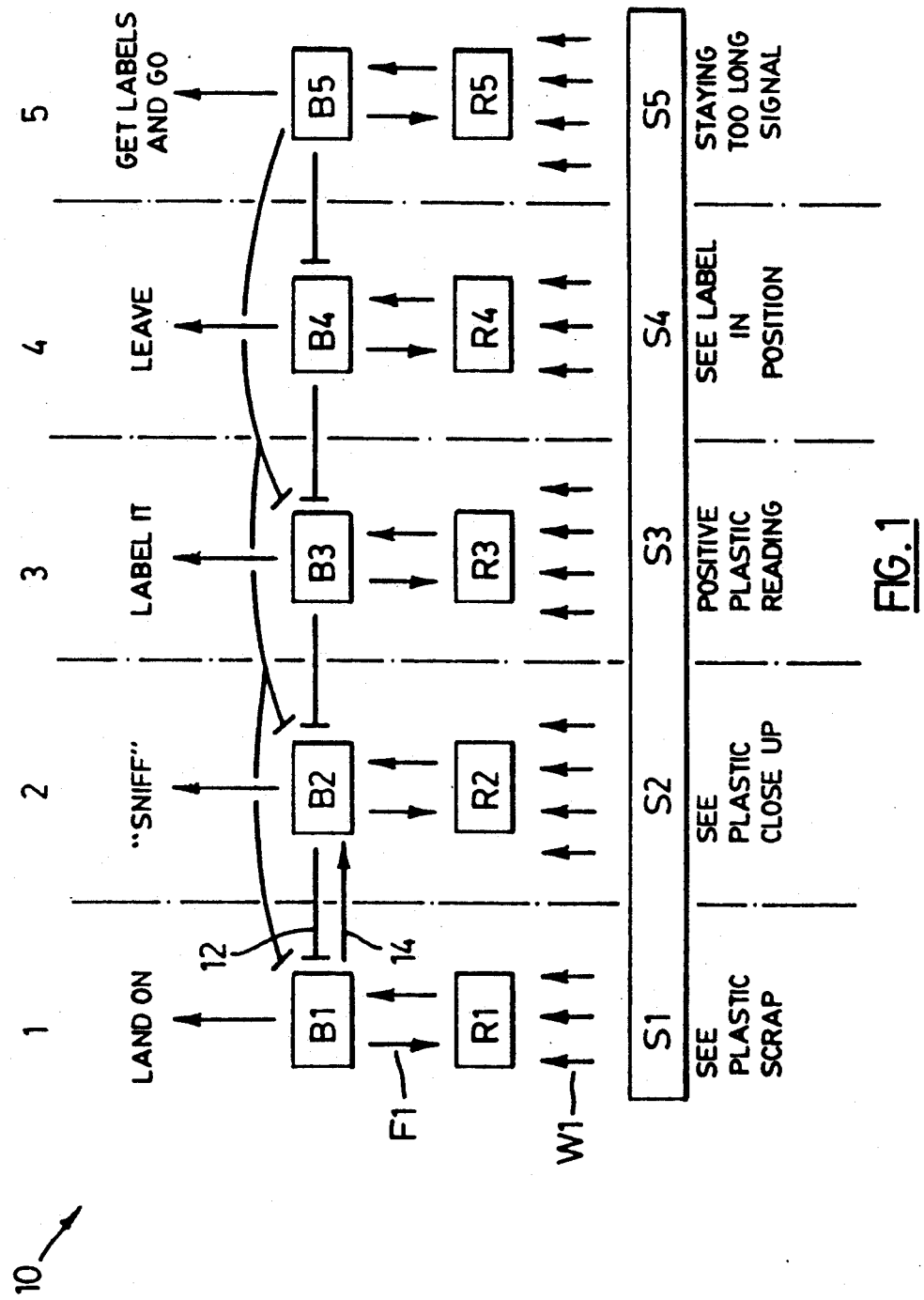
FIG. 1 is a block diagram of a control system in accordance with the preferred aspect of the present invention, as embodied in a plastic scrap labelling machine.

Reference is first made to FIG. 1 of the drawings which illustrates a control system 10, in simplified block diagram form, forming part of a plastic scrap labelling machine for use in the separation of plastic scrap from other material. The machine is intended to identify plastic scrap and label it ready for identification and collection by another machine.

The control system is arranged in a plurality of layers, identified as 1, 2, 3, 4 and 5. Each layer includes one or more sensors S which respond to stimuli in the environment, a plurality of weighted connections W from the sensors S, a trip device R which receives and sums the weighted inputs from the connections W and produces a trip signal when the sum of a selected parameter of the weighted inputs reaches a predetermined threshold level, the trip signal causing a state unit B to become active and initiate a command for some form of action whose consequences, if appropriate, will activate the next layer of the system. On activation of the state unit B in the next layer, the state unit B in the previous layer is suppressed or deactivated. In each layer, every trip device R receives signals across the connections W from each sensor S. These connections W have variable strength or weighting, and "learning" occurs through the weighting changes in the connections W. The weighting in the connections W between the sensors S and the trip device R are modified according to whether the action in the succeeding layer initiated by the previous layer results in the initiation of the successive active state unit B.

There is a positive feedback loop F between each state unit B and the associated trip device R. This helps to stabilize behaviour by causing the state unit B and the trip device R to remain active until inhibited by another state unit, even though the stimulus and signals from the sensors S will generally disappear or be suppressed after the action or command is triggered by the respective state unit B. Fixed inhibitory connections among the state units B provide a winner-take-all situation in which only one action at a time is activated, so that when a new stimulus situation triggers a new action, the previous one will be suppressed or inhibited.

As mentioned above, the control system is formed of a number of layers, each carrying out a sub-task in successive steps. In this example, the machine controlled by the system moves over an area and when the first level of sensors S1 detects, for example, a scrap, which from a certain property of reflectivity or colour, appears to be plastic, the machine will "land" to take a closer look at the material using the second level of sensors S2 which detect surface texture. If the surface texture also suggests that the scrap is of a plastic material, the third level of sensors S3 are activated to chemically evaluate or "sniff" the plastic. If the sensors S3 confirm that the scrap is plastic, the machine will stick a label on the scrap and then leave, after the sensors S4 have ensured that the label is in the correct location on the scrap. There is an over-ride command detected by the sensors S5, to pick up the labels and leave if the machine has not successfully reached the initial leave stage (at level 4) within some preset time.

Each set of connections W are initially weighted so that when the associated sensors S in a layer are presented with stimuli which the sensors have been set to identify as a feature of plastic, the level of activity in the sensors S and thus the level of input signals to the respective trip device R will increase. The learning modifications made to the connections W during the operation of the system strengthen the possibility that the trip device R will be pushed over the predetermined trip threshold by "correct" objects and teach it not to respond to "incorrect" ones.

In this particular example, plastic scrap is initially identified as being more reflective than other material that the machine is likely to encounter so that some of the sensors S1 respond to "shiny" objects. Responses to "wrong" shiny surfaces are eliminated through the learning process provided by the connections, as described below.

The learning procedure is a trial and error process which can be thought of in terms of hypothesis formation and testing. The answer to the hypothesis test, provided by the next layer, can be thought of as providing a teaching input which indicates whether the sensor identification was correct. Depending on whether the identification was correct, the weighting of the connection W from a particular sensor S is altered such that the probability that particular stimulus pattern will result in activation of the trip device is appropriately altered.

To "train" the connections W1, it is necessary to strengthen the response to real plastic scrap and weaken the response to patterns activated by objects which resemble plastic scrap but are not.

This is accomplished as follows: in an initial condition the connections W1 are weighted such that the trip device R1 is activated by an object with certain reflective qualities in the field of vision of the sensors S1. The control system and machine has, in effect, hypothesized that the object is plastic scrap. The trip device R1 activates the state unit B1. The state unit B1 commands the machine to land on the scrap. As the machine moves in towards the scrap, the visual pattern which activated the sensors S1 will disappear, but the feedback between the state unit B1 and the trip device R1 maintains activation of B1 and R1. When the landing process is complete, the control of movement is subsumed by, for example, a contact reflex, and the descent stops. This does not interrupt activation of the state unit B1 or trip device R1, which continues due to the positive feedback loop F1 therebetween. After landing, there will be a stable, visual image available again and the second level of sensors S2 produce signals based on the surface texture of the scrap. If the first level sensors S1 have correctly identified a plastic scrap, the closeup image input signals produced by the sensors S2 and weighted in the connections W2 will activate the trip device R2 which in turn activates the state unit B2 and the third layer of the system is activated and the machine commanded to "sniff" the object with the plastic chemodetector S3.

In the situation where the closeup visual sensors S2 recognize the scrap as plastic, and activate the trip device R2 and thus the state unit B2 which commands the "sniffing", the state unit B2 has inhibitory connections (indicated by blunt-ended lines 12), which are set slightly stronger than any inhibiting or activating connection from the state unit B1 to state unit B2 (indicated by arrows 14). This ensures that state unit B2 shuts off or suppresses state unit B1. In this situation, a trip device R1 now no longer has input from the sensors S1 nor positive feedback from the state unit B1 so that deactivating the state unit B1 will also deactivate trip device R1. Thus, the layer becomes inactive or silent.

Figure 2A:
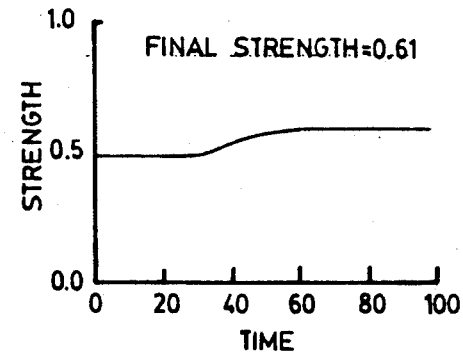
FIG. 2a–d are trip unit output graphs of connection strength against time.
Figure 2B:
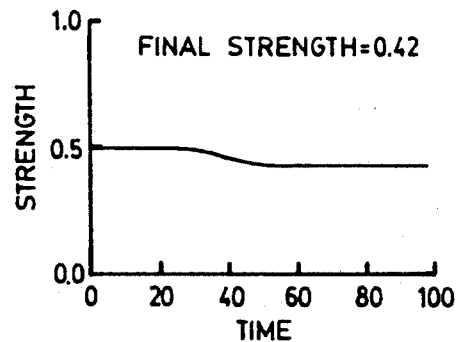
Figure 2C:
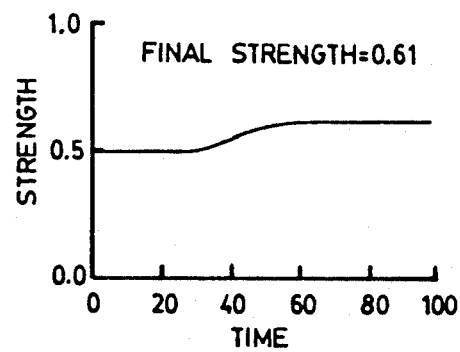

The temporal firing pattern of the sensors S1 and the trip device R1 are illustrated in FIG. 2a of the drawings. It will be seen from the Figure that sensor S1 has been on and off, with trip device R1 on and off just slightly later. This is a strengthening pattern, and a pattern such as this indicates that the connections W1 from the sensors S1 which were active while the trip unit R1 was active should be strengthened or their weighting increased.

Since in this situation an expected time lag due to landing (and the reflectivity of the scrap not being measurable by S1) occurs between the end of activity of sensor S1 and the end of co-activation of the trip device R1, the system incorporates an appropriate time lag constant $\tau$ (tau) to reflect this.

It should be noted that in a basic embodiment of the present invention the time delay between the activation of the trip device R1 and the deactivation of the state unit B1 could be measured as an indication of success or failure, and in such an application a feedback loop F1 would not be required.

The learning process is also capable of refining the ability of the system to recognize plastic and this can be illustrated by the situation in which the sensors S1 include colour detecting sensors which are initially set with very weak or low-weighted connections W1 to the trip device R1. The colour detection sensors S1 which are activated by a particular piece of correctly identified plastic will have the connections W1 to the trip device R1 strengthened, because it is only the temporal relation of the activity patterns that controls the strength changes. The fact that the colour sensor connections W1 were initially so weak as to have negligible influence in pushing the trip device R1 above threshold is irrelevant. Following strengthening of the colour connectors W1, when a similar plastic object is seen again the colour will contribute a greater amount to the recognition process.

Thus, the system allows already effective connections involved in performing successful identifications to self-reinforce, the increment caused by each reinforcement becoming smaller as the connection approaches maximum strength. Thus, the sensors S1 and connections W1 which identify highly reflective objects as plastic continue to do so, and the other sensors S1 and connections W1 gradually learn to identify objects on the basis of colour also, if there are reliable colour cues available.

Figure 2D:
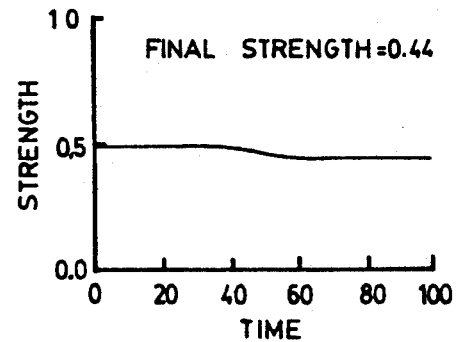

The weakening of connections will now be described, as occurs when the machine lands on a shiny object that the sensors S1 and the trip device R1 have initially identified as plastic but which is not in fact plastic, this being detectable from the surface texture of the scrap. In this situation the sensors S2 which examine the surface texture of the scrap, in combination with the weighted connections W2, will not provide sufficient input or stimulus to activate the trip device R2 to produce a trip signal. Thus, the state unit B2 is not activated and does not inhibit or turn off state unit B1. In this situation the state unit B1 and trip device R1 feedback loop F1 continues uninterrupted, and as inputs from the sensors S1 have disappeared, there will be a period of time significantly longer than the expected time lag $\tau$ (tau) between the deactivation of or loss of input to the sensors S1 and the switching off or inhibition of the state unit, B1 and subsequent deactivation of the trip device R1. Eventually the system over-ride will operate. In this example the over-ride will be detected by the sensors S5, which results in activation of trip device R5 and state unit B5 which inhibits the state unit B1, interrupts the feedback loop F1, and deactivates the trip device R1). This situation results in weakening of the connections W1 which were carrying signals from the sensors S1 to the trip device R1 at the time the trip device produced the trip signal. This activity pattern for the active sensors S1 and the trip device R1 is shown in FIG. 2d of the drawings. Thus, the visual pattern or inputs from the activated sensors S1 caused by the image of the false plastic will be less likely to result in the activation of the trip device R1 in the future.

The above discussion only covers the relationship between the first and second layers of the system. However, a system according to the present invention may also include more than two layers, as does the example described with reference to FIG. 1, and permits information from an incorrect response to propagate backwards down the layers from, for example, the fourth layer of the system.

For illustration, consider the case where a flaw in the label design results in a situation in which some forms of plastic scrap cannot be labelled by the machine. In this situation the machine will initially identify the plastic by way of reflectiveness and colour (layer one), confirm the surface texture of the plastic (layer two), identify and confirm by chemical detection that the material is plastic (layer three) and then attempt to label the scrap, which is the action commanded by the state unit B3. In the fourth layer, a "success" is when the sensors S4 detect a label correctly positioned on the scrap. This triggers the trip device R4 and activates the state unit B4 which, in turn, inhibits or turns off the state unit B3 which issued the command for labelling to take place, which in turn will result in the trip unit R3 being turned off.

If the scrap is of a form which cannot be labelled successfully, the sensors S4 will not detect the label in position and the trip device R4 will not be triggered and thus, the state unit B4 will not be activated to inhibit or turn off the B3/R3 complex. Therefore, the trip device R3 will not turn off until the over-ride activates, as detected by the sensors S5, long after the sensors S3 were active or the original trip signal was produced by the trip device R3. The pattern is sensor S3 "on" then "off", trip device R3 "on". This is the connection weakening pattern shown in FIG. 2d. Repeated weakening will lead to a situation where the machine simply will not try to label this form of scrap when it is detected by the sensors S3.

Once the machine has learned not to attempt to label the unlabelable scrap, the system will still lead the machine through the various identifying steps with the unlabelable scrap up to the second layer, where the state unit B2 activates operation of the chemical sensors S3. However, as the unlabelable scrap identifying connections W3 have been weakened to such an extent that the trip device R3 is not activated on "sniffing" unlabelable scrap, the state unit B2 will remain active until the over-ride operates. Thus, the failure to achieve a positive labelable plastic identification in the third layer will result in weakening of the connections W2 which lead from the sensors S2 which detect textural features of the unlabelable scrap. Once these connections W2 are sufficiently weak, a similar process in the first layer will eventually result in the sensors S1 learning not to identify such unlabelable scraps as "plastic". Thus, the machine has learned to ignore the unlabelable scrap, by propagating the information about the labelling difficulty backwards through the layers.

Figure 3:
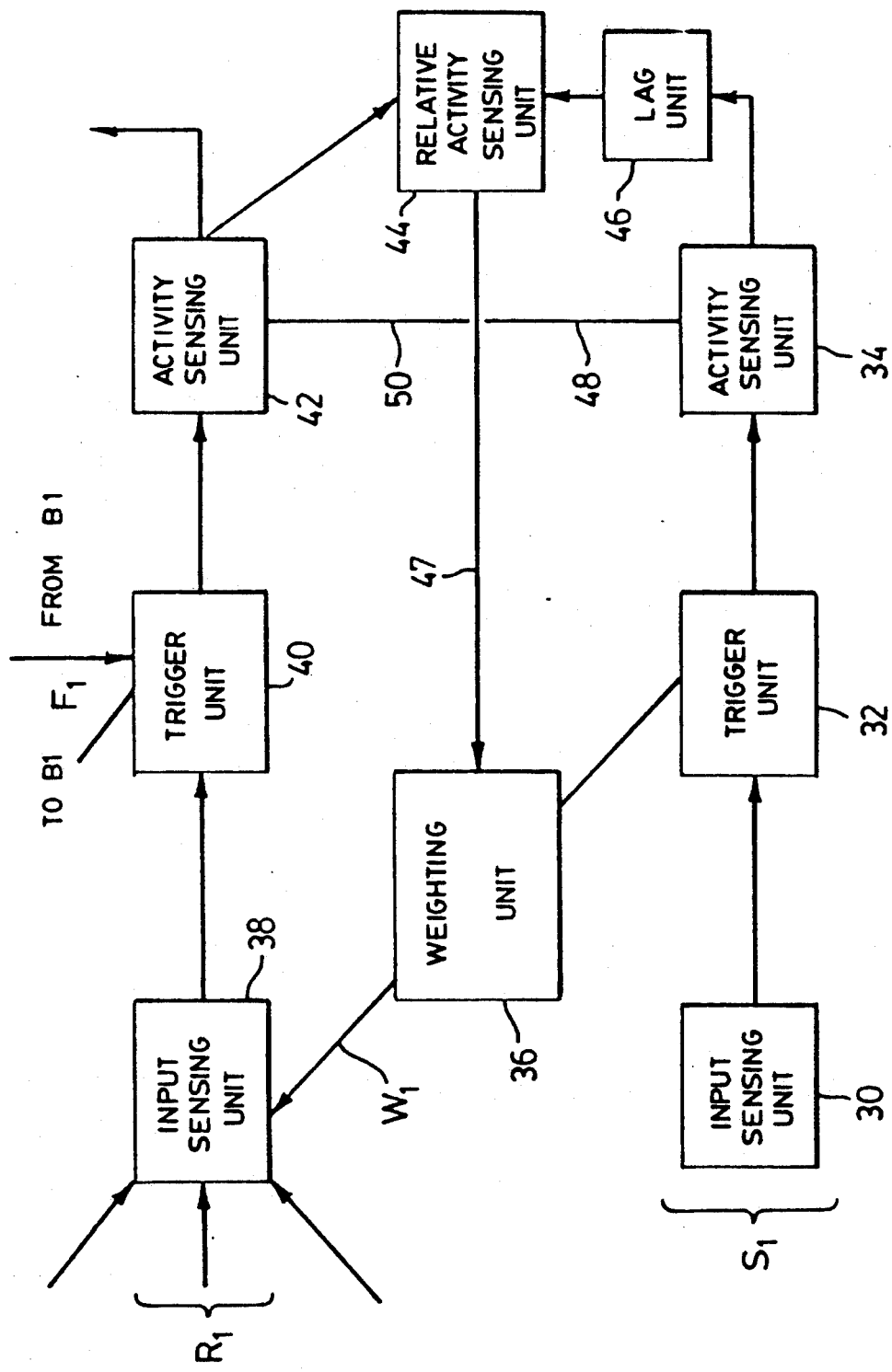
FIG. 3 is a more detailed block diagram of area 2 of FIG. 1.

Reference is now made to FIG. 3 of the drawings which illustrates, in somewhat more detail, the components of the sensors S1 and the trip unit R1, and the mechanism whereby connection weight is altered. It should be noted that FIG. 3 illustrates only a single sensor S1 to simplify the diagram and to facilitate understanding of the operation of the system.

The sensor includes an input sensing unit 30 which supplies signals to a transmission or trigger unit 32. The trigger unit 32 is provided in the sensor so that inputs from the sensing unit 30 caused by noise and the like are not relayed as signals to the trip unit R1, signals only being passed to the trip unit R1 once the inputs reach a predetermined threshold level. The sensor S1 also includes an activity sensing unit 34, which records periods of activity of the sensing unit 30.

Input signals from the trigger unit 32 pass through the connection W1, which includes a weighting unit 36, to an input sensing unit 38 of the trip unit. This input sensing unit 38 receives inputs from a plurality of sensors though, as mentioned above, only one sensor is illustrated in the Figure. When the inputs from the various sensors reach a predetermined threshold level, a trigger unit 40 is activated and in turn activates B1 which provide feedback to keep the trigger unit 40 active, even if input from the sensors falls below the threshold level. An activity sensing unit 42 records the activity of the trigger unit 40.

As described above, the weighting applied to the connectors W1 is varied depending on the temporal relationship between the activity or firing pattern of the sensor and the trip unit. The relative activity of the sensor S1 and the trip unit R1 is recorded in a relative activity sensing unit 44, linked to the activity sensing units 34, 42. The link between the activity sensing unit 34 of the sensor and the relative activity sensing unit 44 is subject to the time-lag $\tau$ (tau), the lag being effected by a lag unit 46. For simplicity we first describe the operation when there is no lag.

There is a direct connection 47 between the relative activity sensing unit 44 and the weighting unit 36, however, the link 47 is acted upon by inhibitory connections 48, 50 from the activity sensing units 34, 42 so that the weighting unit 36 is only modified by the relative activity sensing unit 44 when the activity sensing units 34, 42 become inactive.

The values in each of the units 34, 42, 44 decay with time, but the value in unit 44 decays more slowly such that, for example, if the activity sensing units 34, 42 are active at the same time and become inactive at the same time the values held in the units 34, 42 will initially be relatively high and the values held in the unit 44 will remain relatively high for a period after 34 and 42 have decayed to inactivity, leading to, in this example, a strengthening of the connection W1. A more detailed explanation of the relationship between the activities of the units 34, 42, 44 is set out below, in which the strength change mechanisms may be described by way of a mathematical model.

As mentioned above, the values held in the sensing units 34, 42, 44 decay over time. This is accomplished as follows. The values held in the units are modified by respective smoothing units. These are units that accept a signal and record a time-weighted average of the signal. For a given smoothing unit, with register $\beta(t)$ recording the smoothed average, the value of $\beta(t)$ at time t is given by the differential equation $d\beta/dt = \lambda(f(t) - \beta(t))$, where $\lambda$ is positive, either variable or constant, and f(t) is the signal at time t. $\lambda$ is called the decay parameter.

The mechanism for strength change in a variable strength S to R connection, W, is as follows. Each given connection has designed into it a time-delay, $\tau$ provided by lag unit 46. Thus, the connection strengthens or weakens according to the co-activity in R at time t and S at time $t-\tau$.

In the equations below, we denote by $\alpha_S$ and $\alpha_R$ the activity registers of the sensor S and trip unit R as held in the units 34, 42. These activity registers are smoothing units, as described above, recording a time-weighted average of the activities of S and R respectively. The signals received by $\alpha_S$ or $\alpha_R$ is 1 if the particular trip unit or sensor is on at time t, and 0 it is off at time t. The decay parameter has two possible values: $\zeta$ if the trip unit or sensor is on at time t, and $\eta$ if the trip unit or sensor is off at time t, Here $0 < \eta < \zeta$.

Thus the controlling differential equation (for either $\alpha_R$ or $\alpha_S$) is $$d\alpha/dt = \begin{cases} \zeta(1 - \alpha(t)) & \text{if the neuron is on at time } t \\ \eta(-\alpha(t)) & \text{if the neuron is off at time } t \end{cases}$$

The effect of having $\eta < \zeta$ is that when the neuron is on its activity register increases rapidly towards 1, whereas when it is off it declines more slowly towards 0.

The time delay $\tau$ is introduced by setting $\alpha_{Sd}(t) = \alpha_S(t-\tau)$. Thus the strength change will depend on the "correlation" between $\alpha_{Sd}$ and $\alpha_R$.

Next we denote by RASU the relative activity smoothing unit held or value in unit 44. The signal received by RASU represents the "correlation" between $\alpha_R$ and $\alpha_{Sd}$ as determined by a co-activity function $A(x,y)$. This is a function of two variables defined for $0 \leq x \leq 1$ and $0 \leq y \leq 1$ exemplified by the formula:

$$A(x,y) = g((2x + y - 1)/2), \text{ where } g(u) =$$

$$\begin{cases} -4(u - .5)(u - 1.5), u \geq 5 \\ 13(u + 3)(u - .5), 1 \leq u \leq 5 \\ -2.08e^{100/u}, 0 \leq u \leq 1 \end{cases}$$

Since $\alpha_{Sd}$ and $\alpha_R$ vary between 0 and 1 we can substitute in $\alpha_{Sd}(t) = x$ and $\alpha_R(t) = y$ to get $$A(t) = A(\alpha_{Sd}(t), \alpha_R(t))$$

A(t) is called the co-activity of S and R at time t, and can vary between in this example between $-2$ and $+1$.

As described, the co-activity then serves as the signal for the relative activity smoothing unit (RASU), whose value is held in unit 44. The value of the RASU register is denoted by $\xi(t)$, and its controlling differential equation is $$\frac{d\xi(t)}{dt} = \mu(A(t) - \xi(t))$$

Here $\mu$ is a positive constant which is less than $\eta$, the decay constant for the activity registers. The effect of $\mu<\eta$ is that the RASU remembers co-activity longer than $\alpha_R$ and $\alpha_S$ remember activity.

There is one final register, located in the weighting unit 36: the connection weight register, w(t), whose value is the current strength, or weight, of the connection. It will vary between 0 and a pre-assigned constant $w_{max}$, increasing if $\xi(t) \geq 0$ and decreasing if $\xi(t) < 0$. The controlling differential equation is exemplified by dw/dt=

$$dw/dt =$$

$$\begin{cases} [k_1(1 - \alpha_{Sd}(t))^{MS}(1 - \alpha_R(t))^{MR}|\xi(t)|](W_{max} - w(t)), \text{ if } \xi(t) \geq 0 \\ [k_2(1 - \alpha_{Sd}(t))^{MR}(1 - \alpha_R(t))^{MR}|\xi(t)|](-w(t)), \text{ if } \xi(t) < 0 \end{cases}$$

[Here MS, MR, $k_1$ and $k_2$ are constants. For this register the decay parameter is rather complex, namely $$\lambda(t) = \begin{cases} [k_1(1 - \alpha_{Sd}(t))^{MS}(1 - \alpha_R(t))^{MR}|\xi(t)|] \text{ if } \xi(t) \leq 0 \\ [k_2(1 - \alpha_{Sd}(t))^{MS}(1 - \alpha_R(t))^{MR}|\xi(t)|] \text{ if } \xi(t) < 0 \end{cases}$$

The effect of the factor $(1-\alpha_{Sd}(t))^{MS} (1-\alpha_R(t))^{MR}$ is that activity in S or R (which causes $\alpha_S$ and $\alpha_R$ to be close to 1) prevents w(t) from changing. That is, it inhibits consolidation. The magnitude of the rate of change of w(t) depends on the magnitude of the RASU register $\xi(t)$. The sign of $\xi(t)$ determines the direction of change of w(t), increasing towards $w_{max}$ if $\xi(t)$ is positive and decreasing towards 0 if $\xi(t)$ is negative.]

By way of example, FIGS. 2a-d of the drawings illustrate a trip unit output graph of connection strength against time, depending on various possibilities of activity in the trip unit R and the sensor S. The parameters are set as shown in the Figure, and the manner in which the symbols above relate to the parameter names is shown. In the 11111 symbols for activity, each 1 represents 10, or one TAUGAP.

Figure 4A:
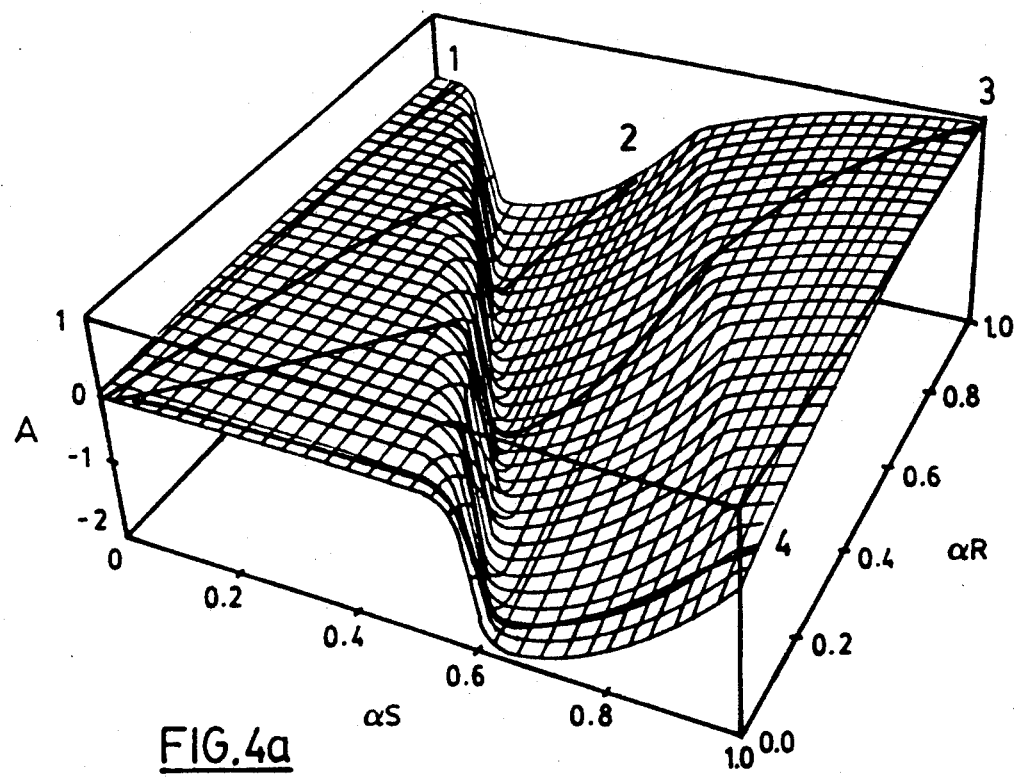
FIGS. 4a–b are plots of the forcing function which controls the smoothing unit for strength change command.
Figure 4B:
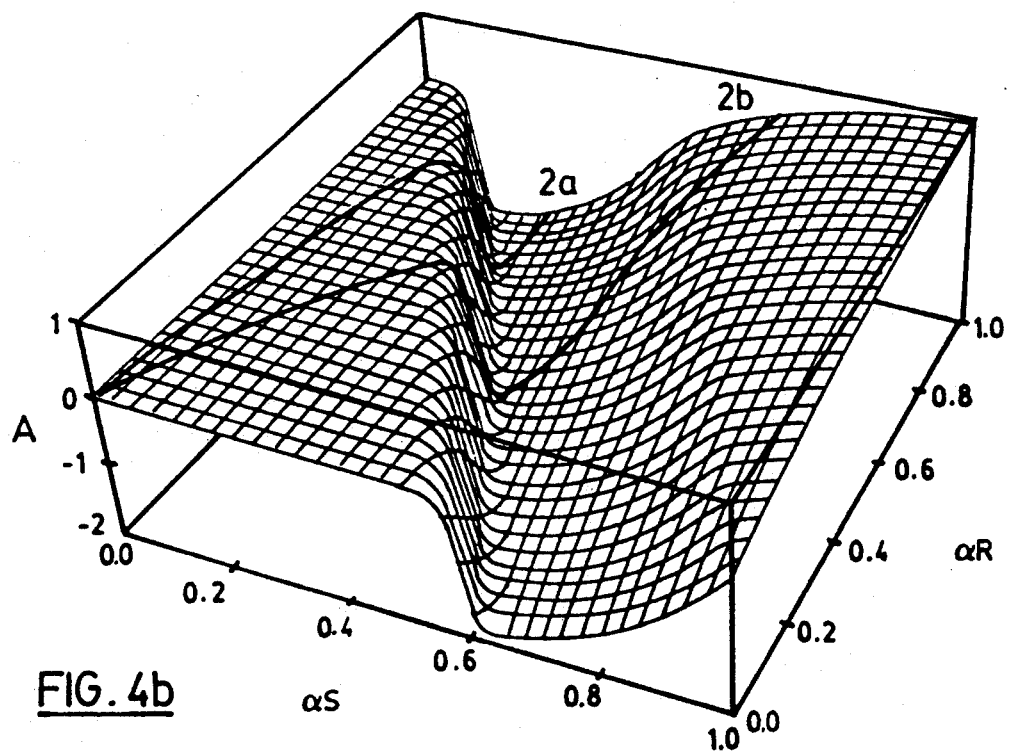

FIGS. 4a-b of the drawings plot the coactivity function A(x,y) which is used to construct the signal to the relative activity smoothing unit RASU. The x axis is $\alpha_S$ and the y axis is $\alpha_R$. The graph itself plots the surface on which A(t) moves while $\alpha_S$ and $\alpha_R$ vary. Another set of equations which produced a surface which resembled this would produce the same behaviour in terms of how temporal firing patterns would control connection strength, and would therefore be equivalent. The general shape of the surface is what produces the required behaviour of the strength change command. Curves 1 through 4 in FIG. 4a show how the $\alpha_R$ and $\alpha_S$ decay back to 0 when both the sensor S and the trip unit R turn off.

Path 1 shows that if $\alpha_S$ was very low and $\alpha_R$ very high, there is little tendency to change strength. Thus if S is off and R fires strongly, there will only be the smallest tendency to weaken the connection—virtually no change will occur if R fires alone briefly.

Curve 2 shows that if $\alpha_S$ is intermediate and $\alpha_R$ is high when activity ends, the decay back to 0 will be mostly through the "trough" section (and of course the no change section, provided such that noise and 'blips' in the sensors S and trip units R will not influence weighting) and the connection will weaken. This is the situation in FIG. 2d, where $\alpha_S$ has been off long enough to have decayed considerably before R turns off. If the amount of connection weakening vs. the duration of R activity following S's switch-off is graphed, it is seen that there is a rather long range of R activity durations during which considerable weakening occurs. Thus, it is not necessary to have to arrange the system architecture so that the over-ride action cuts in at a narrowly specified time after S stops firing. This happens because $\alpha_S$ is changing rather slowly by the time R switches off (since the rapid-change section of its decay course occurs just after it switches off) and so the path tracks along the trough rather than directly across it. Thus even if R switches off while $\alpha_S$ is in the positive section near the trough, the long period in the trough will dominate [(2b), FIG. 4b]. On the other hand if $\alpha_S$ is low enough that the path starts in the trough, there is not a long period in the trough, but neither is there any positive period to be balanced, so weakening still occurs [(2a), FIG. 4b].

Curve 3 shows how proper co-termination will strengthen the connection, when switch-offs occur near the "correct" interval of $\tau$ time units apart, so that both $\alpha_R$ and $\alpha_{Sd}$ are approximately the same. Here the path remains in the positive section for a long time, and cuts relatively directly across the trough, so net strengthening occurs.

This curve also allows one to see graphically why it is important to set a high value for $\zeta\eta$, the constant determining how quickly $\alpha_S$ and $\alpha_R$ rise when activity begins. If $\zeta\eta$ is too small, then after the usual bout of firing $\alpha_S$ and $\alpha_R$ will not be near 1. The path will begin to be followed part way down, say at (0.8,0.8), so the positive section of the path will not be as long, and strengthening will not dominate. Thus if $\zeta\eta$ were much too small weakening would occur.

It should also be noted that during a normal strengthening-inducing co-activity bout if some sensors S fire only weakly or intermittently so their $\alpha_S$ values are intermediate rather than high, their connection weakens rather than strengthens. This happens because for these S to R connections the relevant path will be path 2, instead of path 3. The system thus filters out input from near-threshold sensors, while strengthening connections from those which are reliably firing.

Finally, curve 4 shows why S activity with no co-activity in R weakens the connection, because the path here stays in the trough.

In addition to having the weighting or strength of connections W in a layer modified in relation to the temporal activity of the trip device R and state unit B in a respective layer, it is also possible to modify the connections as a function of the temporal activity of state units B in succeeding layers. This will be described now with reference to FIG. 5 of the drawings, which illustrates a control system 20 for use in a garbage collecting machine intended for collecting plastic containers where there is a risk that certain plastic containers contain corrosive or hazardous material. The simplified Figure illustrates three layers in a chain (a, b2, c2) of actions relevant to corrosive materials, and another layer in a chain (a, b1 ...) of actions relevant to successful collection of non-corrosive material. The two chains have the same initial layer, Sa, Ra, Ba. The sensors Sa in the first layer identify a plastic container, a successful identification tripping the device Ra to activate a state unit Ba, which issues a command for the machine to collect the container. This will lead in turn to the activation of the next step, Bb1, in the collection process. In the second layer the sensors Sb2 detect the contents of the container and if the contents are corrosive, trigger the trip device Rb2 which activates the state unit Bb2 to remove the container from the machine and simultaneously notify a central controller that corrosive material has been located.

The connections Wa between the sensors Sa and the trip device Ra are similar to those described with reference to the above-described labelling machine application in that the weighting or the strength of the connections Wa will be modified based on the temporal activity of the sensors Sa, trip device Ra and state unit Ba. However, the weighting of the connections Wa will be strengthened in circumstances where the state units Ba and trip device Ra is suppressed or turned off by the state unit Bb1. That is, when the collection action is immediately accomplished the connections Wa from the sensors Sa which detect containers will be strengthened. Some collected containers will contain corrosive material detected slightly later.

In the situation where the second level sensors Sb2 detect a corrosive material the state unit Bb2 and a trip device Rb2 will be activated, then suppressed or turned off relatively quickly by the Sc2, Rc2, Bc2 layer, as soon as the container is gone and base notified. Clearly, it is desirable that the connections Wa which connect the sensors Sa which detected the corrosive containing container should be weakened in this situation, but as in this example this may not be possible.

In the illustrated example, there are also connections Wab between the sensors Sa and the trip device in the second layer Rb. These connections Wab are adapted to be strengthened in these circumstances. The connections Wab strengthen because the on-off activation of Sa is followed by the on-off activation of Rb2, and only co-activation patterns control strengthening. Thus, in situations where containers carrying corrosive material have been detected by the sensors Sa, the strengthened connections Wab will trigger the trip device Rb to activate the state unit Bb to indicate a corrosive material has been located, without the intermediate step of placing the container in the machine. Note that the system can thus learn on the basis of consequences beyond those immediately following B activation. As mentioned above, the system may include time lag factors $\tau$ (Tau) to accommodate time delays, in this case a longer time lag factor would be provided to accommodate the time interval between the plastic container being seen and being analyzed for corrosive contents.

Figure 6:
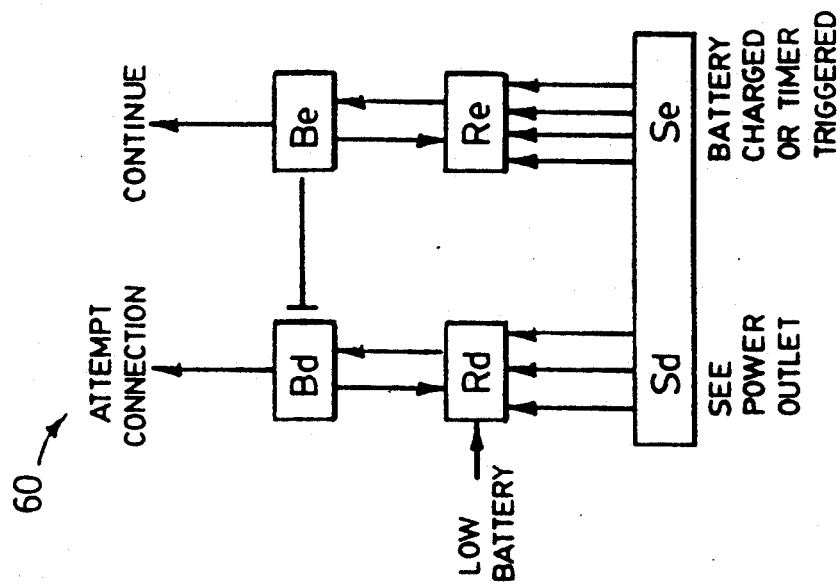
FIGS. 6, 7 and 8 are block diagrams of a control system in accordance with a still further aspect of the present invention, as embodied in a battery powered machine.

Reference is now made to FIG. 6 of the drawings which illustrates a control system 60 for use in a machine which is electrically powered, power being provided by a re-chargeable battery. The system operates when the battery of the machine is on low charge and is intended to allow the machine to find a power outlet, to plug into the power outlet and thus, recharge the battery. The example is intended to illustrate a "deficit reduction" feature of the system.

The control system is arranged in two layers. The first layer includes a trip unit Rd which is activated when the battery charge falls below a predetermined level, and continues firing while the battery charge is below this threshold level. The state unit Bd commands that the machine approach objects that the machine has visual sensors focused on that point in time, followed by an attempt to connect with a power outlet, and if no connection is made to move off in a different direction. A machine with a low battery will thus begin to approach various objects in the environment.

The trip unit Rd remains active or continues to fire continuously, since unsuccessful instances of approach have no effect on the battery condition. Thus, the connections Wd to the trip unit Rd are not subjected to strength changes, because the connection strength change requires that the trip unit Rd be silent or inactive during consolidation or strengthening (due to the inhibitory connections, such as those illustrated as 48 and 50 in FIG. 3). Therefore, the connections Wd to Rd are not affected by unsuccessful actions, that is, by actions which do not precede recharging.

In the situation where the move forward is successful, the machine plugs in and recharges its batteries. The battery is now recharged, such that the trip unit Rd becomes silent, and a strength change can occur. The relevant connections Wd are those connecting whatever sensors Sd happen to be active just before they move forward. For these connections the firing pattern is that shown in FIG. 2c, which is a strengthening pattern.

Figure 5:
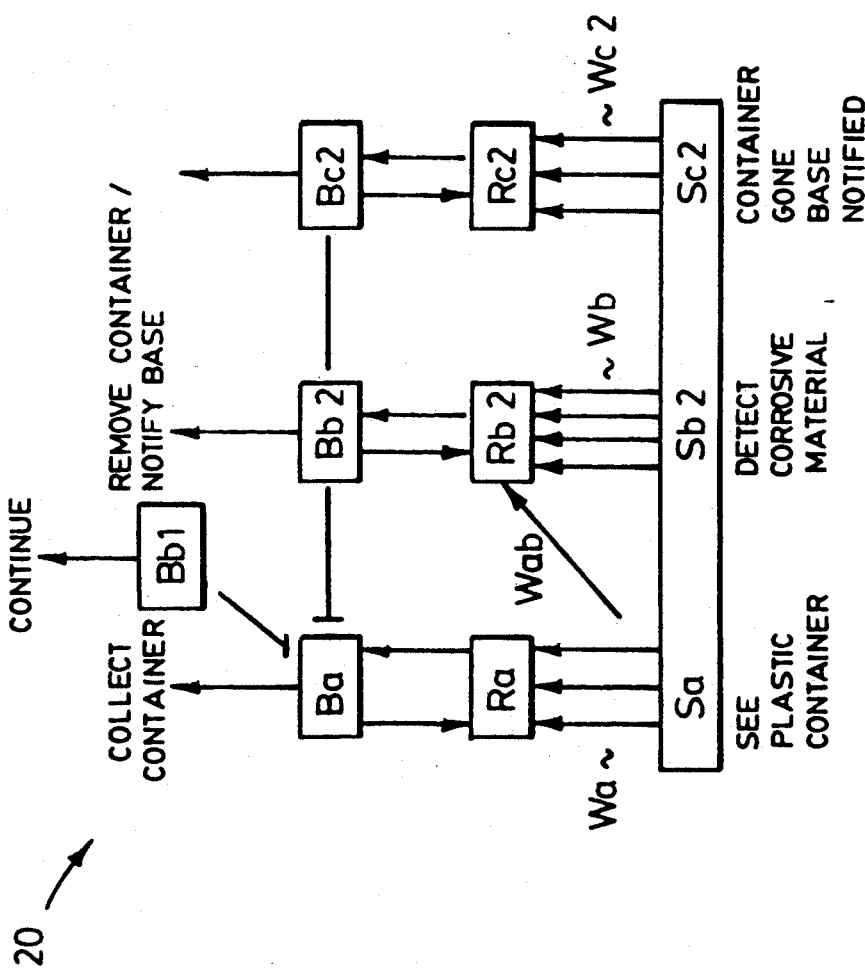
FIG. 5 is a block diagram of a control system in accordance with a further aspect of the present invention, as embodied in a collection machine.
Figure 7:
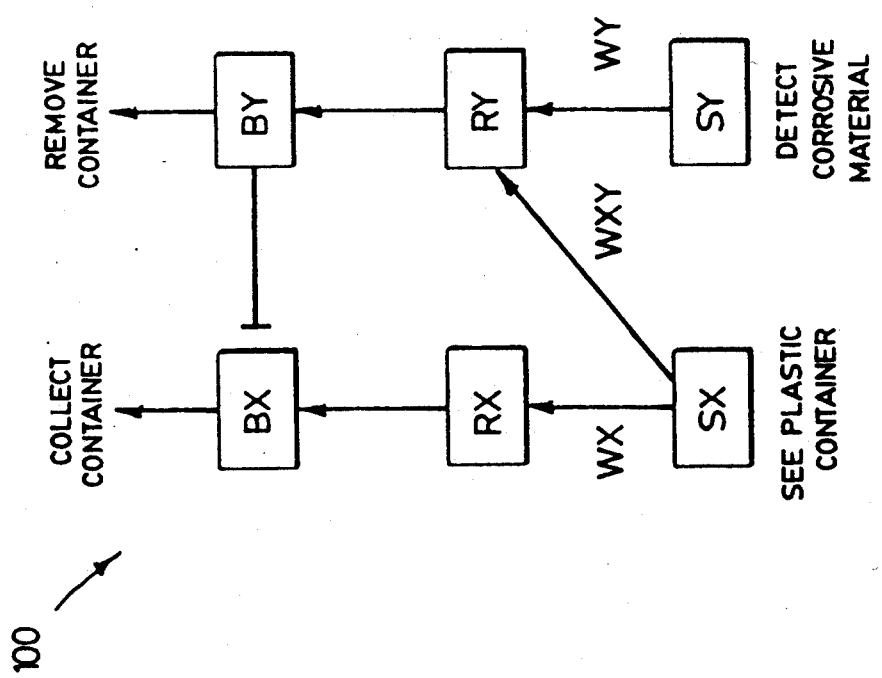

Reference is now made to FIG. 7 of the drawings which illustrates a control system 100 for use in carrying out the same function as the system described with reference to FIG. 5 of the drawings, but in which the control system is of a somewhat simpler nature. In the system, the first level sensor SX locates plastic containers, and as soon as the container is located the trip unit RX activates the state unit BX to collect the container and move on to locate the next container. In the second level, the sensor SY detects corrosive material in the container which has been taken on board. On detecting corrosive material the trip unit RY is activated to produce a trip signal which activates the state unit BY which removes the container from the machine and notifies base. The unit BY also suppresses the unit BX (or any activity which takes place as a result of the container being collected). In this particular example the connections WX, WY are "fixed" and they have no learning capacity. However, there is a connection WXY from the sensors SX to the trip unit RY. This connection is strengthened in situations where the sensors SY detect the presence of a corrosive material and allow the system to learn to identify containers which hold corrosive material without taking the container on board, as the strengthened connections WXY will identify plastic containers which carry corrosive material and will cause a trip signal to be produced by the trip unit RY to activate BY and thus suppress BX, preventing the container from being taken on board. To allow this, there is a short delay between the production of a trip signal from trip unit RX before state unit BX becomes active.

It will be noted that in this example there is no feedback loop between the trip units R on the state units B. Accordingly, unlike the examples described above in which the strengthening is correlated by relating the activities of the sensors and the trip units, in this case the strengthening is a function of the delay between the production of the trip signal from the trip unit RX and the suppression of the state unit BX. Accordingly, the trip unit RX and the state unit BX include activity registers for maintaining activity values which are a function of the periods of activity of the respective trip and state units RX, BX. The system further comprises a co-activity register for maintaining a co-activity value which is a function of the activity values, the activity and co-activity being subject to respective decay functions, the modification of the weighting applied to the connection WXY being a function of the co-activity value when the activity of the trip unit RX and the state unit BX ceases. The activity registers include smoothing units and may accommodate appropriate lag times, as described above with reference to FIG. 4 of the drawings.

Figure 8:
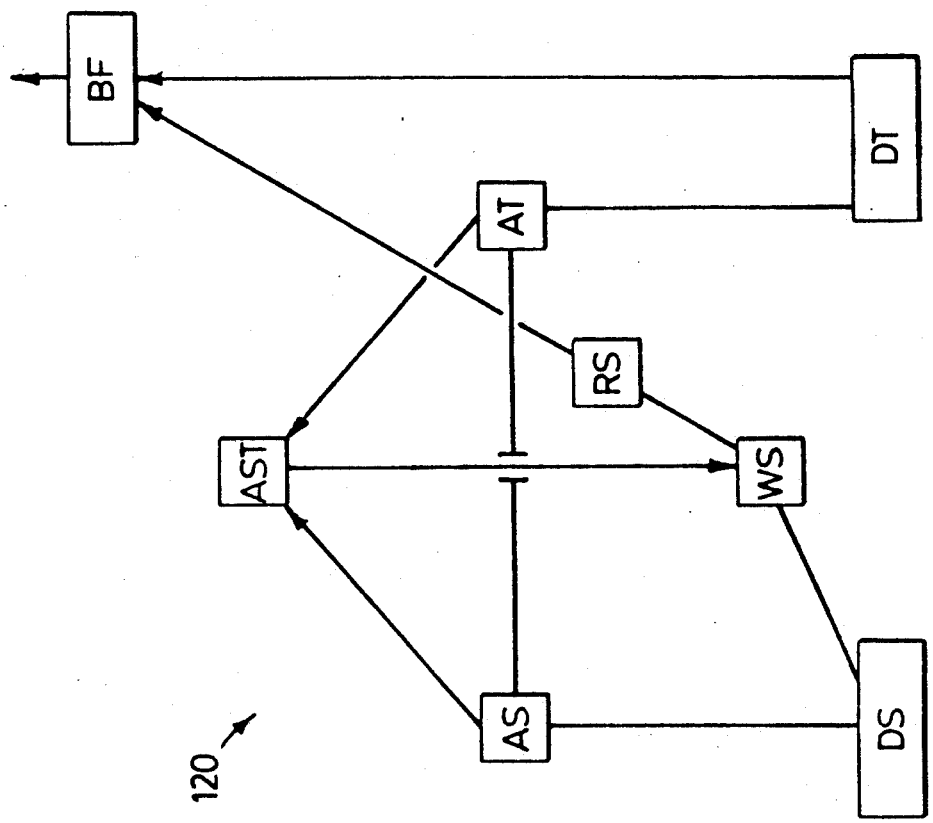

Reference is now made to FIG. 8 of the drawings which illustrates a somewhat different configuration in accordance with an aspect of the present invention. The control system 120 is part of a fire alarm system and includes a smoke detector DS and a high temperature detector DT. There is a connection WS between the smoke detector DS and a fire alarm BF. The smoke detector BS indicates where there is smoke in an area, and the high temperature detector where there is a high temperature in the area, as a result of fire. In an initial condition the connection WS between the smoke detector DS and fire alarm BF is insufficient to trigger the fire alarm, which initially can only be triggered by the high temperature sensor DT. However, the system may be "taught" to set off the fire alarm BF on detection of smoke by the smoke detector DS. This is achieved through correlation of the output of the smoke detector DS and the output of the high temperature detector DT. In practice, this will mean that a period of activity of the smoke detector DS which is followed by a period of activity of the high temperature detector DT will result in a strengthening of the connection WS such that when the smoke detector DS detects a similar condition again, the fire alarm DF will be activated without requiring activation of the high temperature alarm DT.

To allow this configuration, the sensors must produce signals which stop after a certain period. In this example, the sensors are of the onset type, in which the sensors will create a burst of activity on sensing a certain condition. The weighting of the connection WS is a function of the time between the ends of the bursts of activity of the respective sensors DS, DT.

The connection WS passes through a trip unit RS which determines the strength of signals from the sensor DS which are sufficient to activate the alarm BF. Both sensors DS, DT include activity registers AS, AT for maintaining activity values which are a function of the periods of activity of the respective sensors. Also provided is a co-activity register AST for maintaining a co-activity value which is a function of the sensor activity values, the activity and co-activity being subject to respective delay functions and the modification of the weighting applied to the connection WS being a function of the co-activity value when the activity in both sensors DS, DT ceases. The measure of activity of the smoke detector DS is, in this example at least, required to include a time lag function $\tau$ (Tau), as there will clearly be a delay between the detection of smoke and detection of high temperature resulting from fire.

The activity and co-activity registers may operate in a similar manner as described above with reference to FIG. 4.

From the above description it will be noted that the control system of the present invention may operate in a wide range of applications in addition to those described above. It will, of course, be clear to those skilled in the art that the above described embodiments are merely exemplary, and that various modifications and improvements may be made to the invention without departing from the scope of the invention.

I claim:

1. A control system for initiating an action in response to a plurality of variably weighted inputs, comprising:
   (a) means for receiving a plurality of first input signals;
   (b) means for applying a weighting to the first input signals;
   (c) trip means for receiving the weighted first input signals, summing the signals and being activated to produce a trip signal when the sum of the weighted first input signals reaches a predetermined threshold level;
   (d) means for initiating a first active state on receiving the trip signal;
   (e) means for receiving a second input signal on initiation of the first active state;
   (f) means for initiating a second active state when the second input signal reaches a predetermined threshold level, initiation of said second active state suppressing the first active state;
   (g) means for timing the delay between the production of the trip signal and the suppression of the first active state; and
   (h) means for modifying the weighting applied to the first input signals as a function of said delay.

2. The system of claim 1, wherein the weighting modifying means are adapted to increase the weighting applied to the first input signals which contributed to reaching of the threshold if the delay is shorter than a predetermined time interval and to decrease the weighting applied to the contributing first input signals if the delay is longer than the predetermined time interval.

3. The system of claim 1, wherein means are provided for holding an indication of the production of the trip signal in the delay timing means with a lag interval corresponding to a time delay between the production of the trip signal and the receipt of the second input signals.

4. The system of claim 1, and further comprising trip and first state activity registers for maintaining activity values which are a function of the periods of activity of the respective trip means and first active state initiating means and a coactivity register for maintaining a coactivity value which is a function of the trip and first state activity values, the activity and coactivity values being subject to respective decay functions, the modification of the weighting applied to the first input signals being a function of the coactivity value when the activity in both the trip means and the first activity means is suppressed.

5. The system of claim 4, wherein said decay functions are smoothing functions.

6. The system of claim 1, wherein if the weighted sum of the second input signals fails to reach the predetermined threshold level, and thus does not initiate the second active state, within a predetermined time interval, the first active state is suppressed and the weighting modifying means decreases the weighting applied to the first input signals which contributed to the first parameter.

7. The system of claim 1, wherein the first active state initiating means may be activated separately of the production of the trip signal.

8. The system of claim 1 in which a plurality of second input signals are received and further comprising:
   means for applying a weighting to the second input signals;

secondary trip means for receiving the weighted second input signals, summing the signals and being activated to produce a secondary trip signal when the sum of the weighted second input signals reaches a predetermined threshold level;

means for initiating the second active state on receiving the secondary trip signal initiation of said second active state suppressing the first active state;

means for receiving a third input signal on initiation of the second active state;

means for initiating a third active state when the third input signal reaches a predetermined threshold level, initiation of said third active state suppressing the second active state;

means for timing the delay between the production of the secondary trip signal and the suppression of the second active state; and means for modifying the weighting applied to the second input signals as a function of said delay.

9. A method of modifying the conditions for initiating an action in response to a plurality of inputs, comprising:

(a) receiving a plurality of first input signals;

(b) applying a weighting to the first input signals;

(c) summing the weighted signals and producing a trip signal when the sum of the weighted signals reaches a predetermined threshold level;

(d) initiating a first action on production of the trip signal;

(e) receiving a second input signal on initiation of the first action;

(f) initiating a second action when the second input signal reaches a predetermined threshold level, initiation of said second action suppressing the first action;

(g) timing the delay between the production of the trip signal and suppression of the first action; and (h) modifying the weighting applied to the first input signals as a function of said delay.

10. A control system for initiating an action in response to a plurality of variably weighted inputs, comprising:

(a) means for receiving a plurality of first input signals and becoming active on receiving said first input signals;

(b) means for applying a weighting to the first input signals;

(c) trip means for receiving the weighted first input signals, summing the signals and becoming active when the sum of the weighted first input signals reaches a predetermined threshold level;

(d) means for initiating a first active state and deactivating the first input signals receiving means on the trip means becoming active;

(e) means for providing a positive feedback from the first active state means to the trip means to maintain the trip means active when the first input signals receiving means becomes inactive;

(f) means for receiving a second input signal on initiation of the first active state;

(g) means for initiating a second active state when the second input signal reaches a predetermined threshold level, initiation of said second active state suppressing the first active state and the positive feedback from the first active state means to the trip means;

(h) means for measuring the temporal relationship between the deactivation of the first input signals means and the end in activity of the trip means; and (i) means for modifying the weighting applied to the first input signals as a function of said temporal relationship.

11. The system of claim 10, and further comprising first input signal receiving means and trip means activity registers for maintaining activity values which are a function of the periods of activity of the respective first input signal receiving means and trips means and a coactivity register for maintaining a coactivity value which is a function of the signal receiving means and trip means activity values, the activity and coactivity values being subject to respective decay functions, the modification of the weighting applied to the first input signals being a function of the coactivity value when the activity in both the signal receiving means and the trip means is suppressed.

12. The system of claim 11, wherein said decay functions are smoothing functions.

13. A control system for initiating an action in response to a plurality of variably weighted inputs, comprising:

(a) means for receiving a plurality of first input signals;

(b) first trip means for producing a first trip signal on receiving the first input signals;

(c) means for initiating a first active state on production of the first trip signal;

(d) means for receiving a second input signal on initiation of the first active state;

(e) means for initiating a second active state on receiving the second input signal, initiation of said second active state suppressing the first active state;

(f) means for applying a weighting to the first input signals;

(g) second trip means for receiving the weighted first input signals, summing the weighted signals and being activated to produce a second trip signal when the sum of the weighted first input signals reaches a predetermined level, the production of the second trip signal resulting in the direct initiation of the second active state;

(h) means for timing the delay between the production of the first trip signal and the suppression of the first active state; and (i) means for modifying the weighting applied to the first input signals as a function of said delay, modification of the weighting permitting activation of the second state without the intermediate step of activation of the first state on the first input signal receiving means receiving signals of a form previously correlated with subsequent activation of the second state.

14. The system of claim 13, wherein the first trip means and the first state means include activity registers for maintaining activity values which are a function of the periods of activity of the respective trip and state means and further comprising a coactivity register for maintaining a coactivity value which is a function of the activity values, the activity and coactivity being subject to respective delay functions, the modification of the weighting applied to the first input signal being a function of the coactivity value when the activity of the first trip means and the first state means ceases.

15. The system of claim 14, wherein said decay functions are smoothing functions.

16. A control system for initiating an action in response to one or more output signals, comprising:
(a) means for producing a first output signal indicating an initial condition;
(b) means for producing a second output signal indicating a subsequent condition;
(c) means for initiating an active state on receipt of the second output signal;
(d) means for applying a weighting to the first output signal;
(e) trip means for receiving the weighted first output signal, summing the weighted signal and being activated to produce a trip signal when the weighted first output signal reaches a predetermined threshold level, the production of the trip signal resulting in the initiation of the active state;
(f) means for timing the delay between the production of the first output signal and the production of the second output signal; and
(g) means for modifying the weighting applied to the first output signals as a function of said delay, modification of the weighting permitting initiation of the active state in response to production of the first output signal.

17. The system of claim 16, wherein the signal producing means are onset sensors and the delay timing means measures the interval between the cessation of outputs from the sensors.

18. The system of claim 16, wherein the signal producing means include activity registers for maintaining activity values which are a function of the periods of activity of the respective signal producing means and further comprising a coactivity register for maintaining a coactivity value which is a function of the signal producing activity values, the activity and coactivity being subject to respective delay functions, the modification of the weighting applied to the first input signal being a function of the coactivity value when the activity in the input signals ceases.

19. The system of claim 18, wherein said decay functions are smoothing functions.

* * * * *